(12) United States Patent
McGahan

(10) Patent No.: US 7,202,958 B1
(45) Date of Patent: Apr. 10, 2007

(54) MODELING A SAMPLE WITH AN UNDERLYING COMPLICATED STRUCTURE

(75) Inventor: William A. McGahan, Spicewood, TX (US)

(73) Assignee: Nanometrics Incorporated, Milpitas, CA (US)

( * ) Notice: Subject to any disclaimer, the term of this patent is extended or adjusted under 35 U.S.C. 154(b) by 365 days.

(21) Appl. No.: 10/859,330

(22) Filed: Jun. 1, 2004

(51) Int. Cl.
*G01B 11/28* (2006.01)
(52) U.S. Cl. .................. 356/630; 356/237.2; 356/237.1
(58) Field of Classification Search ................ 356/630, 356/237.2, 237.1; 250/559.45
See application file for complete search history.

(56) References Cited

U.S. PATENT DOCUMENTS

| | | | | |
|---|---|---|---|---|
| 5,963,329 A | | 10/1999 | Conrad et al. .............. 356/613 |
| 6,483,580 B1 * | | 11/2002 | Xu et al. .................... 356/300 |
| 6,485,872 B1 * | | 11/2002 | Rosenthal et al. ............ 430/30 |
| 6,654,108 B2 | | 11/2003 | Ravid et al. .............. 356/237.2 |
| 6,720,568 B2 | | 4/2004 | Finarov et al. ......... 250/559.45 |
| 6,940,592 B2 * | | 9/2005 | Borden et al. .............. 356/326 |
| 2003/0210408 A1 | | 11/2003 | Jun et al. .................... 356/630 |
| 2004/0080761 A1 | | 4/2004 | Du-Nour et al. ............. 356/630 |

* cited by examiner

*Primary Examiner*—Layla G. Lauchman
*Assistant Examiner*—Tri Ton
(74) *Attorney, Agent, or Firm*—Silicon Valley Patent Group LLP

(57) ABSTRACT

A model of a sample with one or more films that overlie a complicated structure can be produced using a first portion that models the physical characteristics of the film(s) and a second portion that does not attempt to model the physical characteristics of the underlying structure, but instead models the affect of the underlying structure on incident light. By way of example, the second portion of the model may use a one-dimensional periodic pattern to model a complicated two-dimensional periodic pattern. A characteristic, such as thickness, of the film(s) may be measured using the model. The results may be verified by the linear relationship of ratios between a plurality of measured locations on the sample and associated locations on the sample that do not have the underlying structures.

27 Claims, 5 Drawing Sheets

MODELING A SAMPLE WITH AN UNDERLYING COMPLICATED STRUCTURE

FIELD OF THE INVENTION

This invention relates, in general, to optical metrology and, in particular, to measuring one or more layers that overlie a complicated structure, such as a two-dimensional diffraction pattern.

BACKGROUND

It is often desirable to measure the thickness (or other properties) of a film or film stack during semiconductor processing. Generally, optical metrology techniques, such as reflectometry and ellipsometry, can be used to accurately measure a thin film or film stack. However, in order to accurately measure a film using optical metrology, a good understanding of the material under the film or films of interest is required.

In one conventional metrology technique, a single measurement of the sample is made. The film of interest and the underlying structure are then modeled mathematically. This technique is particularly useful when the underlying structure is a simple structure, such as a uniform film. Unfortunately, when the underlying structure is complicated, such as a two dimensional repeating pattern, analytically modeling the underlying structure can be prohibitively difficult to use this technique.

In another conventional metrology technique, the structure underlying the film of interest is measured prior to deposition of the film of interest. For example, the spectra from the underlying structure is measured, the film is then deposited, and the entire stack is then measured. The measured spectra from the underlying structure can then be subtracted from the spectra from the entire stack. This technique is particularly advantageous where the underlying structure is complicated. However, pre-measuring the underlying structure is undesirable, as it requires two separate measurements of the same location, which is time consuming and often requires removal of the substrate from the deposition tool.

Where there is a complicated structure underlying the film to be measured, conventionally, a separate measurement pad with no underlying structure (or a drastically simplified underlying structure) is used. The measurement pad is located, e.g., in a scribe line or other location on the wafer. While the use of a measurement pad permits easy measurement of the film on the measurement pad, the resulting measurement may not accurately describe the actual device, i.e., the film over the complicated structure. Thus, there is a desire to accurately measure the actual device itself, rather than a measurement pad.

Accordingly, what is needed is an improved optical metrology process that accurately measures one or more films that overlie a complicated structure without requiring two separate measurements.

SUMMARY

An accurate model of a sample that has one or more films that overlie a complicated structure is produced, in accordance with the present invention, using a portion that models the physical characteristics of the film(s) and another portion that models the underlying complicated structure. The portion that models the underlying complicated structure, however, does not attempt to model the physical characteristics of the underlying structure, but instead models the affect of the underlying structure on incident light. By way of example, a one-dimensional periodic pattern may be used to model an underlying two-dimensional periodic pattern. While the portion of the model that describes the underlying structure may be physically inaccurate and, thus, cannot be used to measure the underlying structure, the model of the sample may be used to determine a characteristic, such as thickness, of the overlying film(s).

In one aspect of the present invention, a method includes modeling a sample that includes at least one film and an underlying structure, the underlying structure being a non one dimensional periodic pattern. Modeling the sample includes generating a first portion of the model for the at least one film based on the physical characteristics of the at least one film and generating a second portion of the model for the underlying structure using a one dimensional periodic pattern based on the affect of the underlying structure on incident light. In one embodiment, the method further includes determining a characteristic of the at least one film at a first location on the sample. The characteristic is determined by acquiring data from the sample at the first location where the acquired data being indicative of the characteristic of the at least one film and the surface profile of the underlying structure; calculating data for the model of the sample, the calculated data being indicative of a characteristic of the first portion of the model and the surface profile of the second portion of the model; and comparing the acquired data from the sample and the calculated data for the model of the sample.

In another aspect of the present invention, a method of determining a characteristic of at least one film on the sample, the sample having a structure underlying the at least one film. The method includes acquiring data from the sample wherein the acquired data is indicative of the characteristic of the at least one film and the surface profile of the underlying structure. The method also includes modeling the sample. The sample is modeled by generating a first portion of the model for the at least one film based on the physical characteristics of the at least one film and generating a second portion of the model for the underlying structure. The second portion of the model is not based on the physical characteristics of the underlying structure and is based on the affect of the underlying structure on incident light. The method further includes calculating data for the model of the sample, the calculated data being indicative of a characteristic of the first portion of the model and the surface profile of the second portion of the model. The acquired data from the sample and the calculated data for the model of the sample are then compared. In one embodiment, the method further includes determining a characteristic of the at least one film at a first plurality of locations on the sample having an underlying structure and determining a characteristic of the at least one film at a second plurality of locations on the sample not having an underlying structure. Each location in the first plurality of locations is associated with a location in the second plurality of locations. A plurality of ratios is then produced. Each ratio is between the characteristic of the at least one film at a location in the first plurality of locations and the characteristic of the at least one film at an associated location in the second plurality of locations. It is then determined whether the ratios have a linear relationship.

DETAILED DESCRIPTION

In accordance with an embodiment of the present invention, one or more films that overlie a complicated structure are measured through modeling. The portion of the model that describes the complicated underlying structure does not attempt to accurately model the physical structure of the complicated underlying structure, but instead models the effect of the underlying structure on incident light, e.g., the light reflection and/or scattering from the underlying structure. Thus, while the portion of the model that describes the underlying structure may be physically inaccurate, the model can be used to accurately determine a characteristic, such as the thickness, of the one or more films of interest.

Figure 1:
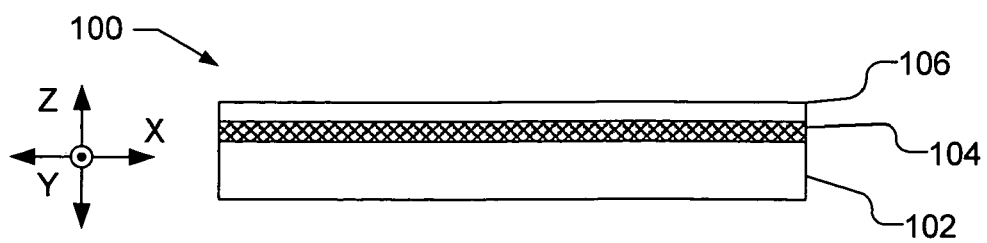
FIG. 1 illustrates a side view of a sample that is problematic to measure using conventional metrology techniques.
Figure 2A:
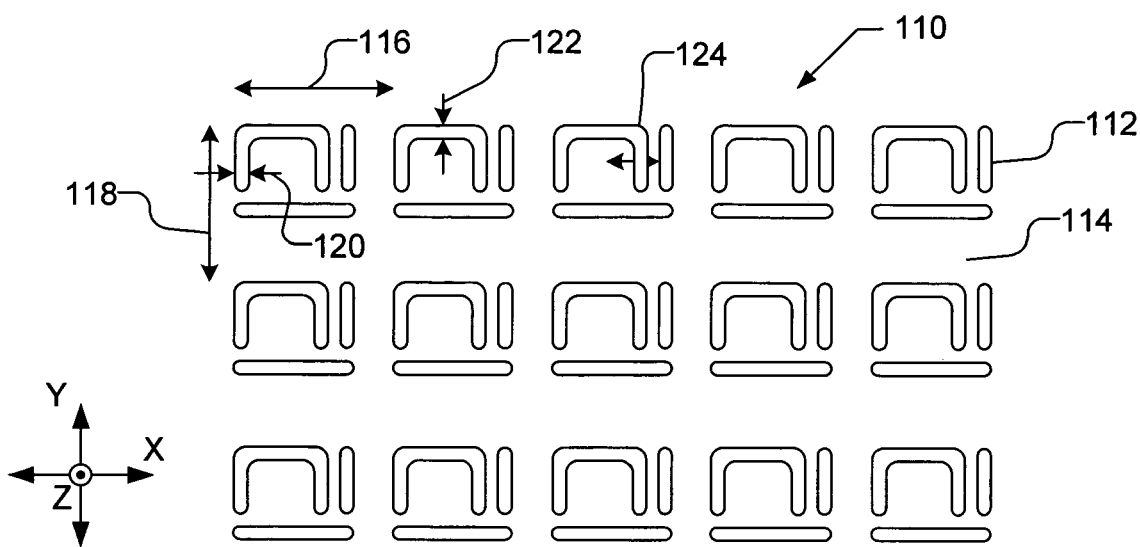
FIG. 2A illustrates a top plan view of an example of a complicated structure that may be included in the underlying layer.

FIG. 1 illustrates a side view of a sample 100 that is problematic to measure using conventional metrology techniques. The sample 100 includes a substrate 102 with a top layer 106 and an underlying layer 104, which includes a complicated structure. FIG. 2A illustrates a top plan view of an example of a complicated structure 110 that may be included in the underlying layer 104. It should be understood that the sample 100 shown in FIG. 1 is exemplary and that if desired additional layers may be present. For example, the top layer 106 may include a plurality of layers, one or more of which are to be measured, but for the sake of simplicity, however, a single layer will be discussed herein. Further, it should be understood that the underlying layer 104 may also include one or more layers.

As shown in FIG. 2A, the structure 110 includes lines 112 made from a first material 112, such as a metal or metal alloy, and surrounding spaces 114 made from a second material 114, such as a dielectric. The lines 112 and spaces 114 form a complicated pattern that is repeated in two dimensions. Thus, the structure 110 is sometimes referred to as a two-dimensional periodic pattern, i.e., the structure 110 has a periodicity in two dimensions (along the X and Y axes). The structure 110, of course, includes a height (along the Z axis shown in FIG. 1), but because the structure does not necessarily have a periodicity along the Z axis.

Figure 2B:
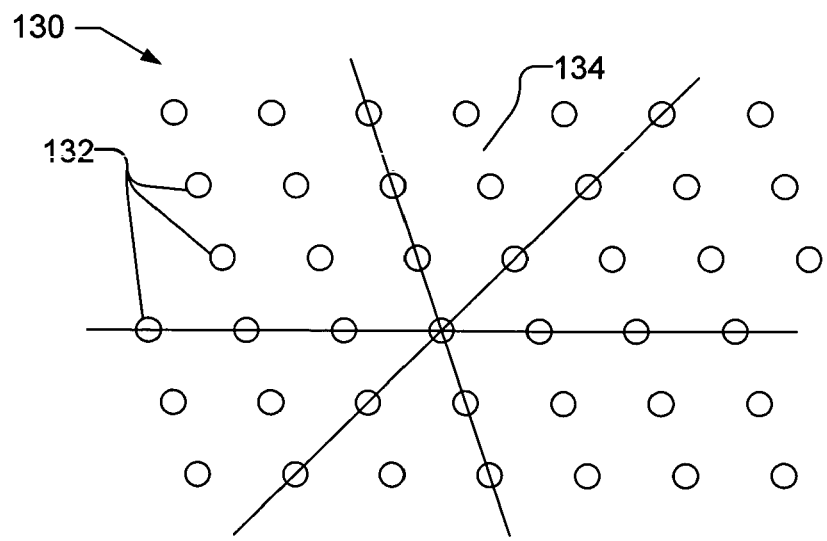
FIG. 2B illustrates a top plan view of another example of a complicated structure that may be included in the underlying layer.

It should be understood that the structure 110 shown in FIG. 2A is exemplary, and that the present invention may be used with samples that include an underlying layer 104 with other types of complicated structures. Moreover, while the structure 110 is illustrated as being periodic in two-dimensions, the present invention may be used with complicated one-dimensional patterns as well as non-periodic patterns. Thus, the structure 110 may include a multilayer structure, a repeated pattern in one or two dimensions, or even a device area where there is non-periodic patterning. By way of example, FIG. 2B illustrates a structure 130 that includes an array of contact holes 132. The contact holes 132 may be, e.g., filled with a first material, such as a metal or metal alloy, and surrounded by a second material 134, such as a dielectric. The structure 130 may then be covered with one or more top layers (not shown in FIG. 2B) of a material that is different than or the same as the material in the contact holes 132.

When measuring the top layer 106 of sample 100 using conventional modeling techniques, the underlying layer 104 is also modeled, to the extent that the underlying layer 104 affects the incident light. Conventionally, when modeling a layer, it is desirable to accurately describe the physical structure of the layer, i.e., the model of a layer accurately resembles the physical structure of the layer. Generally, to produce an accurate physical model using conventional modeling techniques, an estimated model is produced and a response to incident light is calculated for the model. The calculated response is then compared to the measured response of the sample. Variable parameters in the model, such as line width, pitch, and sidewall angel, are iteratively adjusted until there is a match between the calculated response from the model and the measured response from the sample. When the calculated response and measured response match, the characteristics of the model accurately represent the physical characteristics of the layer.

With a complicated structure, such as structure 110 in FIG. 2A, however, producing an accurate physical model is difficult. Because the structure 110 is a two-dimensional structure, variable parameters, e.g., in line width and pitch, occur along both the X and Y axes, as indicated by arrows 116, 118, 120 and 122. Moreover, the sidewall angles of the lines may also vary in along the X and Y axes. Thus, producing an accurate physical representation of the structure 110 may require an excessive number of iterations which makes the conventional iterative determination of an accurate physical model of the structure 110 impractical.

In accordance with an embodiment of the present invention, a model of the sample 100 includes a portion that models the underlying structure 110. The portion of the model for the underlying structure, however, does not attempt to accurately describe the physical characteristics of the underlying structure, but instead is intended to model the "effect" of the underlying structure on incident light, such as reflection and scattering of the light. Thus, model portion for the complicated structure 110 is sometimes referred to herein as an "effective model".

Figure 3:
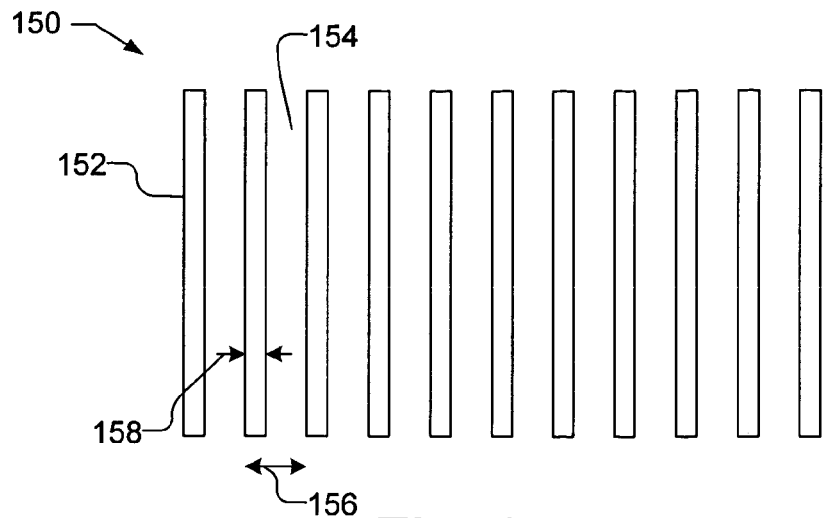
FIG. 3 illustrates a top plan view of a portion of a model for the underlying structure in accordance with the present invention.

FIG. 3 illustrates a top plan view of an effective model 150 that may be used in accordance with the present invention. As illustrated, the effective model 150 is a one dimensional periodic pattern, i.e., a line grating, that includes lines 152 and spaces 154. Despite being geometrically dissimilar to the structure 110, the effective model 150 can be used advantageously to simulate the effects of structure 110 in the layer 104 on light in order when measuring the top film 106.

The use of a one dimensional periodic pattern as the effective model 150 is advantageous as the variable parameters of the model lie in only one dimension. Accordingly, when iterative adjustments of parameters of the model are made, the adjustments are limited to only one dimension. Thus, the number of possible variations in the effective model 150 is reduced with respect to the actual structure 110. As illustrated in FIG. 3, the effective model 150 may be varied in pitch, as indicated by arrow 156 and in line width, as indicated by arrow 158. The sidewall angles of the lines 152 may also be varied.

In one embodiment, the top layer 106 can be measured using a model of the sample 100 that includes an effective model for the underlying structure and using a metrology technique that is capable of measuring diffracting patterns. The underlying layer 104 is treated as a diffracting structure with the effective model 150. One example of a suitable metrology technique is described in U.S. Pat. No. 5,963,329, which is incorporated herein by reference. Other suitable metrology systems that may be used with the present invention are described, e.g., in U.S. Ser. No. 09/670,000, filed Sep. 25, 2000, entitled "Apparatus and Method for the Measurement of Diffracting Structures", now U.S. Pat. No. 7,115,858, and U.S. Ser. No. 09/844,559, filed Apr. 27, 2001, entitled Measurement of Diffracting Structures Using One-Half of the Non-Zero Diffracted Orders", now U.S. Pat. No. 6,898,537, which are owned by the assignee of the present application and which are incorporated herein by reference.

Figure 4:
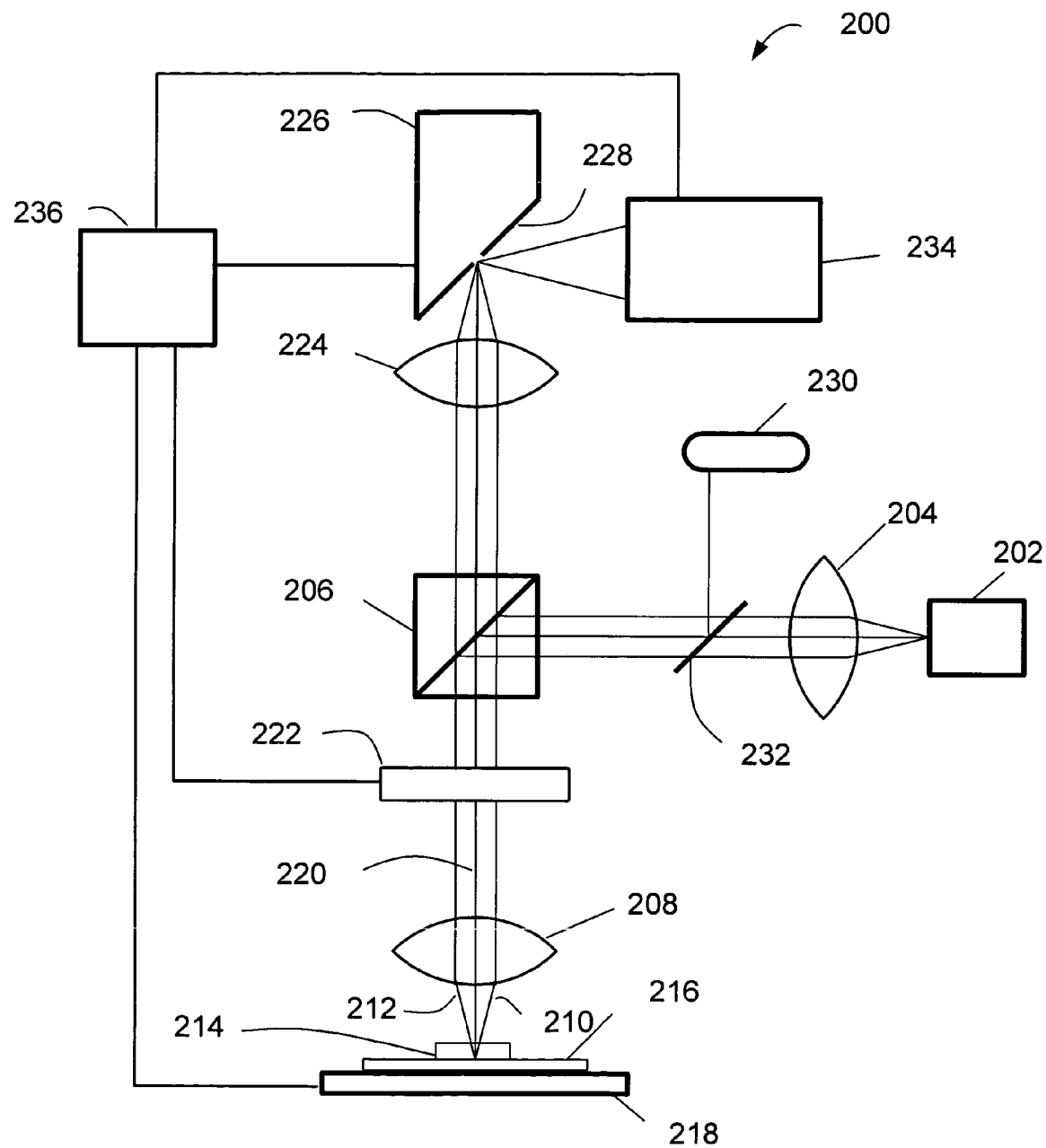
FIG. 4 illustrates a block diagram of a metrology tool that may be used to measure a film or a number of films that overly a complicated structure.

FIG. 4 illustrates a block diagram of a metrology tool 200 that, in accordance with an embodiment of the present invention, may be used to measure a film or a number of films that overly a complicated structure, such as that described in FIGS. 1 and 2 using an effective model of the underlying structure. Metrology tool 200 uses normal incidence light and includes a rotatable analyzer/polarizer 222 that, advantageously, aids in the measurement of diffracting structures.

Metrology tool 200 includes a broadband light source 202, such as an UV-visible light source with wavelengths, e.g., between 200 nm to 200 nm, that produces unpolarized light. The unpolarized light is collected and collimated by lens 204. Beam splitter 206 directs a portion of the collimated, broadband, unpolarized light beam toward the sample 214 that is held on a movable sample stage 218. The sample 214 may similar to sample 100 shown in FIG. 1 and include one or more films to be measured that overlie a complicated structure, e.g., such as structure 110 shown in FIG. 2A.

Disposed between the beam splitter 206 and the sample 214 is the rotatable analyzer/polarizer ("RAP") 222. The light reflected by beam splitter 206 toward the sample passes through the RAP 222 and is linearly polarized. The rotation of RAP 222 is controlled by a computer 236 in a manner known to those skilled in the art. In another embodiment, RAP 222 is stationary while computer 236 rotates sample stage 218 so that the sample 214 is rotated relative to RAP 222.

The RAP 222 passes only the electric field component of the light that is coincident with the polarization axis of the RAP 222 and thus controls the orientation of the light that is incident on the sample. The RAP 222 may be, e.g., Glan Taylor air-spaced polarizer, a dichroic Poloroid sheet, or any other appropriate linearly polarizing device. The light from RAP 222 is focused by objective 208 so that the light is normally incident on sample 214. While marginal rays 210 and 212 are at small angles from the normal ray 220 on the sample, the angles are too small to see any polarization effects that occur in conventional ellipsometers, and thus, the light is said to be normally incident on the sample 214. Because RAP 222 is rotated relative to the sample 214, i.e., RAP 222 and/or sample 214 is rotated, the polarization orientation of the incident light need not be aligned with the underlying structure in the sample 214 prior to the metrology process. Consequently, metrology tool 200 may be used, advantageously, with a wafer stage 218 that is capable of any or all of x, y, z, and/or θ movement, as well as a stage that is capable of r-θ movement only.

Light that is reflected or diffracted from the sample 214 is re-collimated by lens 208 and passes through the RAP 222, which linearly polarizes the light. The RAP 222 can be rotated such that the light has an electric field component that is either parallel or perpendicular to the lines of the sample 214, sometimes respectively referred to as the Transverse Electric (TE) or Transverse Magnetic (TM) (which correlate to the S and P polarization modes when the plane of incidence for non-normal linear polarized light is perpendicular to the lines of the sample 214). Any light that is diffracted from sample 214 will have different electric field component intensities and phase than the light that is incident on the structure 214. The RAP 222 passes only the electric field component of the reflected beam that is coincident with the polarization axis of the RAP 222. Thus, RAP 222 advantageously permits detection of different spectral components of the diffracted light.

The light then passes through the beamsplitter 206. The light is then focused by lens 224 to the entrance slit of a spectrograph 226. In an another embodiment, lens 208 may be replaced with a microscope objective and lens 224 removed. Spectrograph 226 may be a conventional CCD, PDA, or similar type spectrograph that disperses the full spectrum of the polarized light into spectral components across an array of detector pixels. Each pixel corresponds to a different wavelength, and thus the spectrograph 226 generates a spectrograph signal as a function of wavelength λ that is transmitted to computer 236. The spectrograph signal is corrected for electronic background as is well known in the art. Because the RAP 222 is rotated through a discrete set or continuous set of angles, Θ, from 0 to 260 degrees, the spectrograph signal is also a function of angle.

The sample 210 may be viewed and aligned using, e.g., a lamp 230 that produces visible light to provide flood illumination via movable mirror 232. This flood illumination is reflected off mirror 228 to a camera and pattern recognition system 234, which may be coupled to computer 236. The pattern recognition system 234 can provide a measure of orientation of sample 214 relative to the RAP 222, if desired, as well as serve as a conventional detector for the sample height. The pattern recognition system 234 provides data to the computer 236, which accordingly adjusts the height of stage 218.

Of course, if desired other metrology systems, such as scatterometers, ellipsometers, reflectometers or the like, including non-normal devices, may be used in accordance with an embodiment of the present invention. Thus, the metrology system may extract data related to the scattering angle as opposed to spectral information from the radiation that is detected.

The computer 236 includes a computer-readable storage medium storing a computer program executable by the computer. The computer program comprises computer instructions for generating a model using an effective model and measuring the top layer of the sample using a model. Generating computer instructions to perform the present invention is well within the abilities of those skilled in the art in light of the present disclosure.

Figure 5:
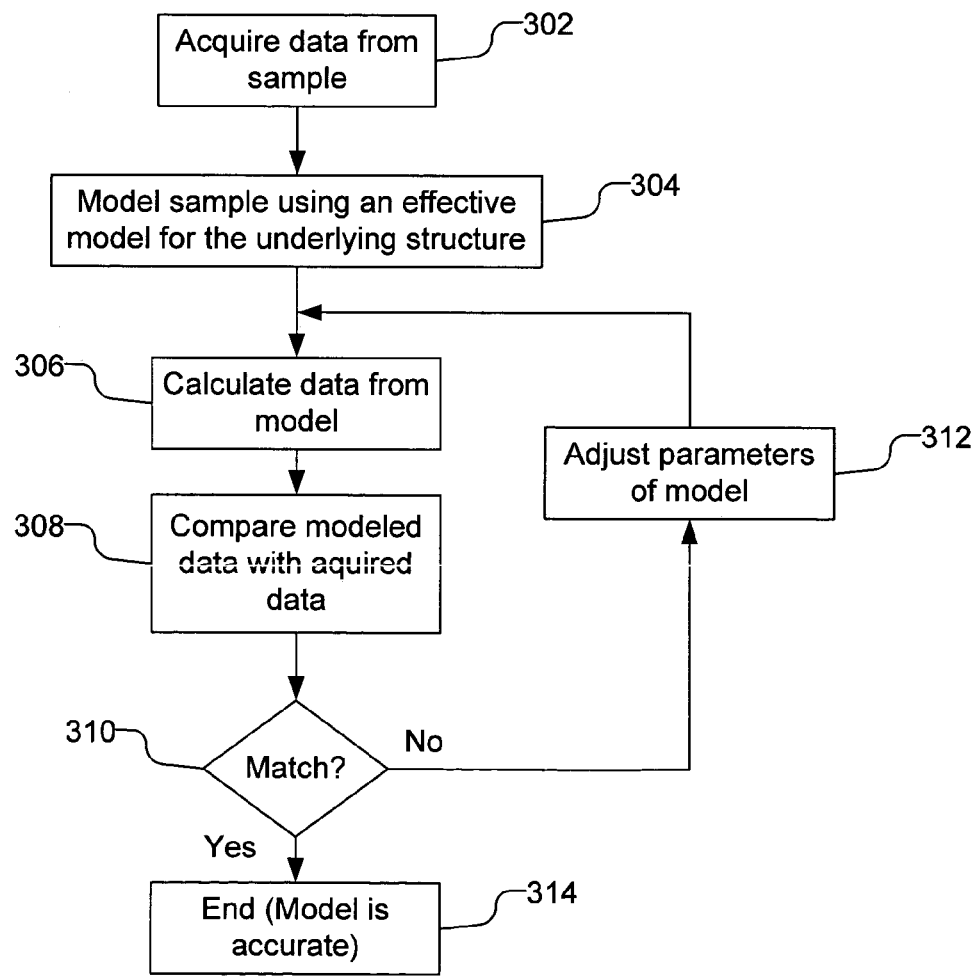
FIG. 5 is a flow chart illustrating a method of measuring a characteristic, such as thickness, of one or more films that overlie a complicated structure.

FIG. 5 is a flow chart 300 illustrating a method of measuring a characteristic, such as thickness, of one or more films that overlie a complicated structure, such as sample 100 illustrated in FIG. 1. Data, such as spectral information and/or scattering information, from the sample is acquired, e.g., using metrology device 200 described above (block 302). It should be understood that spectral information or scattering information may be used with the present invention, but for the sake of simplicity, the present disclosure will refer to acquiring and using spectral information. Thus, by way of example, the metrology tool 200 produces light that is incident on the sample. The light that is scattered and/or reflected from the sample is detected and data is acquired from the detected light. The acquired data is indicative of the characteristics of the film 106 as well as the surface profile of the structure 110 within the underlying layer 104.

A model of the sample is generated using an effective model (block 304). Thus, the model that is generated includes a portion that attempts to accurately reflect the physical characteristics of the film or films of interest and another portion that is an effective model of the structure underlying the film of interest. As discussed above in reference to FIG. 3, the effective model need not be an accurate representation of the physical characteristics of the underlying structure, but attempts to accurately represent the effects that the underlying structure has on incident light.

It should be understood that because the model of the sample is being generated in order to measure portions of the sample, the initial parameters of the model of the sample may not be accurate. The parameters of the initial model, e.g., are based on the sample's desired parameters. For example, the parameters, e.g., the materials and dimensions, of the first portion of the model may be based on the desired structure of the top layer 106 of the sample 100.

Some initial parameters, such as the materials, of the effective model are also selected based on known aspects of the underlying structure. Thus, for example, the materials of the lines 152 and spaces 154 of the effective model 150 shown in FIG. 3 are based on the materials of the lines 112 and spaces 114 of the structure 110 shown in FIG. 2A. Moreover, physical dimensions of the effective model may be based on knowledge of the structure being modeled. By way of example, the line width 158 of the lines in the effective model 150 may be initially selected to be the same as the line width 120 of the lines 112 along the same axis, i.e., the X axis. Similarly, the pitch 156 of the lines 152 of the effective model 150 may be initially selected to be the same as, e.g., the distance 124 between lines 112 of the structure 110, along the X axis.

Thus, it should be understood that while the effective model may not be physically accurate with respect to the actual structure being modeled, the initial selection of the variable parameters of the effective model, such as line width and pitch, may be selected based on an understanding of the characteristics of the actual structure. For example, it has been found that line widths in the effective model that are approximately the same as the line widths in the actual structure (in the same direction), produces a reasonable initial model.

Once the initial model is formed, data of the model's response to incident light (having the same parameters as the light used in the metrology tool) is calculated (block 306). In other words, data, such as the spectra from the model, is calculated. The data may be calculated using any desired technique, such as rigorous coupled wave analysis, or other known techniques, such as modal expansion and finite difference techniques. In general, the calculation of modeled spectra is well known and is described, e.g., in U.S. Pat. No. 5,963,329, and Ser. Nos. 09/670,000, 09/844,559, all of which are incorporated herein by reference.

In one embodiment, the type of data acquired from the sample and calculated from the model is based on a single polarization mode, e.g., one of either the TE or TM polarization modes depending on which has the highest degree of one dimensional symmetry. For example, referring to FIG. 2B, with normal incident linearly polarized light, the TE or TM polarization state of the light in a direction with a high degree of one dimensional symmetry, e.g., along lines 135, 136, or 137, is used. With non-normal linearly polarized light, the plane of incidence should be adjusted such that one of the polarization states, e.g., S or P, lie in a direction with a high degree of one dimensional symmetry, e.g., along lines 135, 136, or 137. Thus, with judicious alignment of the plane of incidence of the non-normal light, at least one of the S and P polarization states correlate with TE and TM polarization modes. It has been found that the use of light having only one polarization mode, e.g., TM or TE, yields a good fit to the measured data. Moreover, because the different polarization modes are separately measured and calculated, the use only one polarization mode simplifies the calculations.

The modeled data is then compared to the acquired data (block 308). By way of example, the Mean-Squared Error (MSE) may be used to compare the acquired and calculated data. If the calculated data is considered to match the measured data (block 310), the portion of the model of the sample that describes the film or films of interest may be assumed to be accurate (block 312). Of course, the portion of the model that describes the underlying complicated structure, i.e., the effective model, may be physically inaccurate.

If, however, the calculated data and the measured data do not match (block 310), the values of the variable parameters in the model are appropriately adjusted (step 314), for example, using the Levenberg-Marquardt algorithm, and the data is recalculated using the new optical model. By way of example, the thickness (or other variable parameters) of the film or films of interest may be adjusted along with the line width, pitch, and sidewall angle of the effective model of the underlying structure.

The calculated data from the new model is then again compared to the acquired data (block 308). If the acquired and modeled data still do not match, the values of the variable parameters of the model are again adjusted (block 314). Thus, the parameters of the model are iteratively adjusted until the calculated data from the model and the acquired data from the sample closely match. A match between the data can be determined when further adjustment of the optical model does not improve the fit or when the fit, which may be determined from the MSE, is below a preselected threshold. When the modeled data and measured data are considered to match, the properties of the film being measured, e.g., the thickness, is considered accurate (block 314). In general, fitting the calculated data from a model to the acquired data from the sample is well known and is described, e.g., in U.S. Pat. No. 5,963,329, and Ser. Nos. 09/670,000, 09/844,559, all of which are incorporated herein by reference.

It should be understood, that the measurement results for the layer 106 produced using an effective model for the underlying structure 110 may not be precisely accurate, but will change monotonically with the real physical changes in the structure being measured. By way of example, if there are two samples with a top oxide film over a complex device structure, where one top oxide film has an oxide thickness of 100 nm and the other has a thickness of 110 nm, a measurement using an effective model in accordance with the present invention may indicate a thickness of 90 nm for the first oxide and 100 nm for the second oxide. Thus, while not precisely accurate, the measurements change monotonically with changes in the actual structure and, therefore, are useful for resolving relative differences in parameters, such as thickness.

Measurements at a plurality of locations of a sample performed, in accordance with an embodiment of the present invention, can be compared to obtain relative measurements for the different locations. The ability to resolve differences in a sample is important to control the many processes, such as chemical mechanical polishing.

There is a possibility that more than one set of parameters for the model will produce calculated data that matches the acquired data. Thus, a verification procedure may be used to ensure that the measurements made using an effective model are correct. In one embodiment, the measurement may be verified by measuring a plurality of locations on the substrate and using the relation between the measurements as verification of the accuracy of the measurements.

Figure 6:
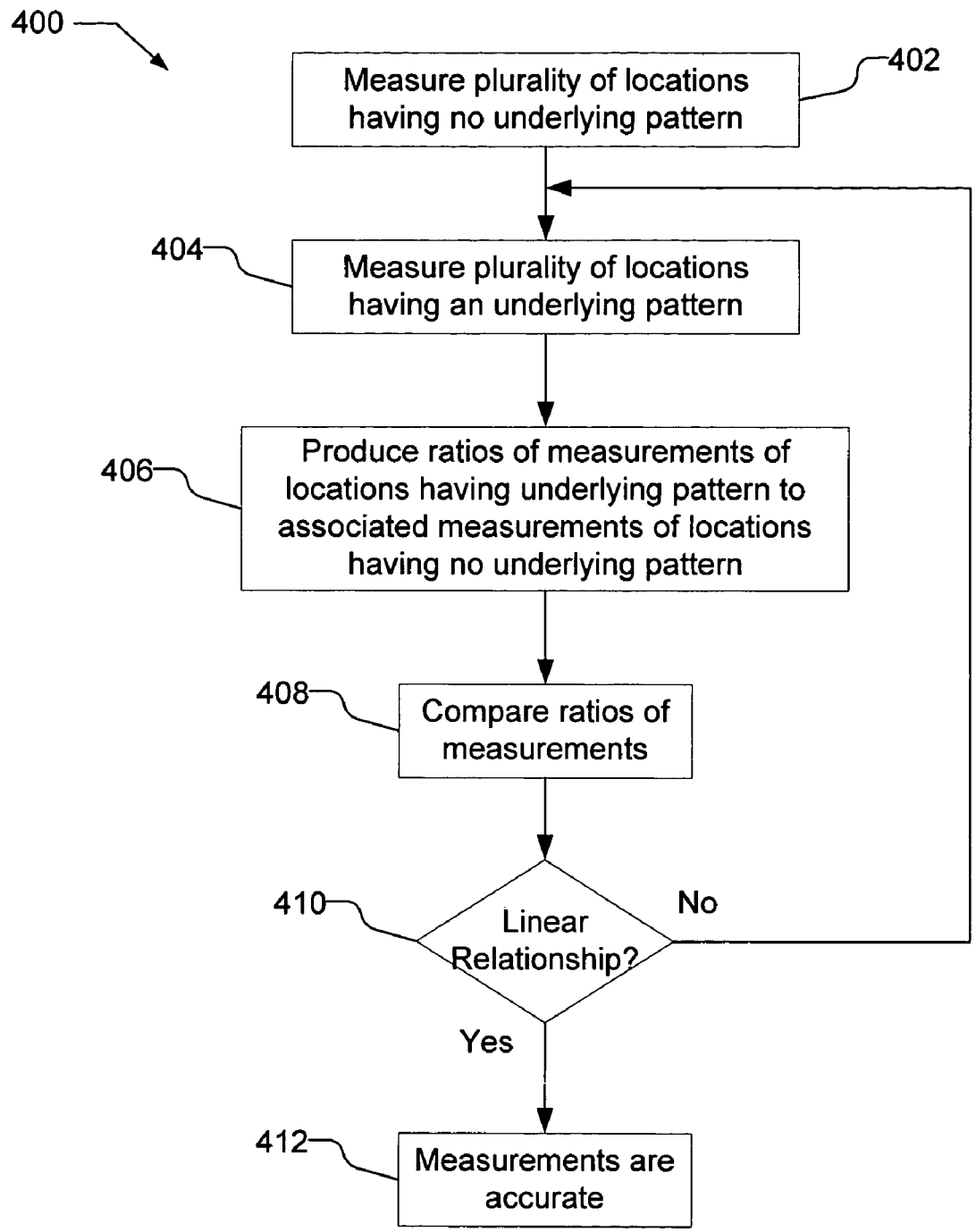
FIG. 6 is a flow chart that illustrates a verification procedure, in accordance with one embodiment of the present invention.

FIG. 6 is a flow chart that illustrates a verification procedure 400 in accordance with one embodiment of the present invention. The verification procedure 400 includes measuring the desired parameter or parameters of the overlying film or film stack, e.g., thickness, at a plurality of locations on the substrate. The measurements are made at a plurality of locations where there is no underlying structure (block 402) and another plurality of locations where there is an underlying structure (block 404). It should be understood that any number of measurement locations may be used, but the greater the number the greater the accuracy. By way of example, approximately 50 measurements may be made of locations with no underlying pattern and the same number of measurements of locations with an underlying pattern.

Figure 7:
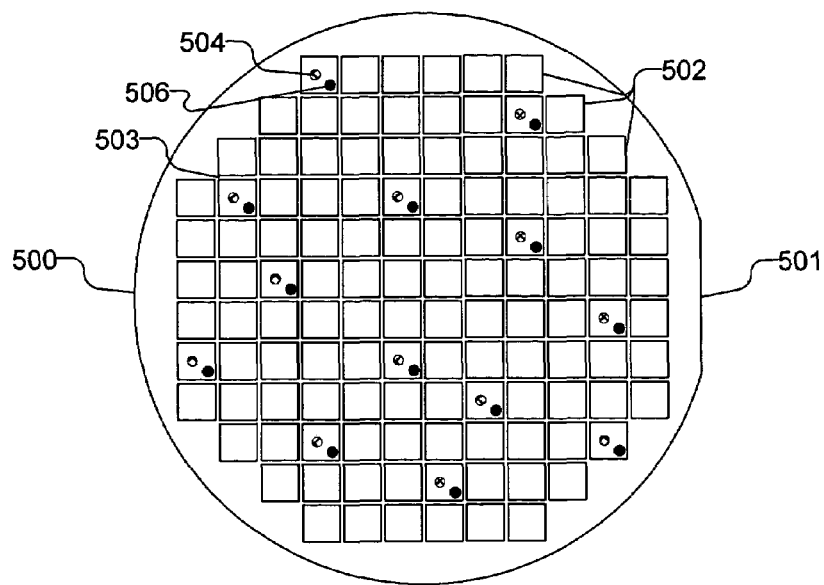
FIG. 7 illustrates a wafer that includes a number of dice, wherein each die has a location with a complicated underlying structure and a location with no underlying structure.

FIG. 7 illustrates a wafer 500 that includes a number of dice 502 wherein each die has a location with a complicated underlying structure and a location with no underlying structure. FIG. 7 illustrates measurements locations having an underlying structure (referred to herein as patterned locations 504) with the hatched circles and measurement locations having no underling structure (referred to herein as unpatterned locations 506) with solid circles 506. The measurements at patterned locations 504 are made using an effective model as described above, while the measurements at unpatterned locations 506 may be made using conventional modeling techniques, e.g., using the same apparatus as used to measure patterned locations 504.

Each patterned location 504 that is measured is associated with a measured unpatterned location 506. By way of example, as illustrated in FIG. 7, associated measurement locations 504 and 506 may be from the same die. Alternatively, associated measurement locations 504 and 506 may be from separate die but are proximately located. In addition, if desired, the unpatterned location 506 need not be from a die at all, but may be located, e.g., in a scribe line 503 between dice.

It should be understood that dice 502 are shown for the sake of illustration, and that while measuring a top overlying film, the individual die 502 may not be visually discernable. Nevertheless, the locations 504 and 506 to be measured on the wafer 500 may be accurately determined using notch 501 as is well known.

Referring back to FIG. 6, ratios of the measurements between the patterned locations 504 and the associated unpatterned locations 506 are produced (block 406). Because the measured properties will change monotonically with real physical differences in the measured properties, if the measurements are accurate the ratios will have a linear relationship. Thus, as illustrated in FIG. 6, the ratios are compared (block 408) and if the ratios have a linear relationship (block 410), the measurements are accurate (block 412). If, however, the ratios do not have a linear relationship (block 410), the measurements are inaccurate. Thus, the patterned location or locations that are inaccurate are remeasured. Thus, as illustrated in FIG. 6, the process flows back to measuring the plurality of location having an underlying pattern (block 404). Of course, when the patterned location is remeasured, the effective model for the underlying structure should have different parameters than previously used.

Figure 8A:
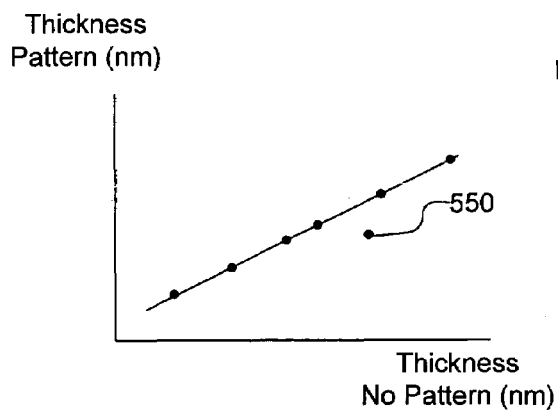
FIG. 8A is a graph illustrating the linear relationship of ratios of patterned and unpatterned measurement locations.
Figure 8B:
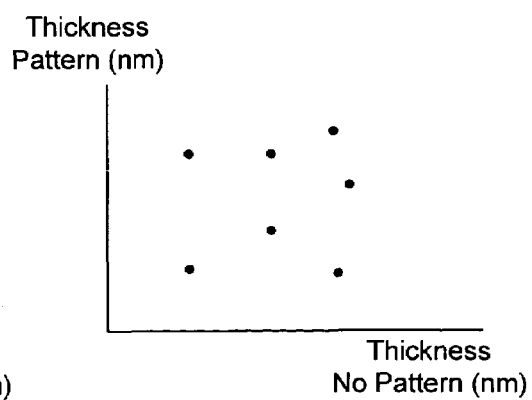
FIG. 8B is a graph illustrating a non-linear relationship of ratios of patterned and unpatterned measurement locations.

FIG. 8A is a graph illustrating the linear relationship of ratios where the measurements are accurate. FIG. 8A illustrates thickness measurements for patterned locations along the Y axis and the thickness measurements of the unpatterned location along the X axis. The data points indicate the ratios of the measurements for a plurality of locations on the substrate. As shown in FIG. 8A, the ratios have a linear relationship and, thus, the accuracy of the measurements of the patterned locations 504 is verified. FIG. 8B, on the other hand, is similar to FIG. 8A, but illustrates the non-linear relationship of ratios when the measurements are inaccurate.

It should be understood that some measurements may be accurate while others are not. Accordingly, the inaccurate measurements may be easily detected and remeasured. For example, as illustrated in FIG. 8A, the ratio indicated by data point 550 does not have a linear relationship with the other ratios, and is thus an inaccurate measurement that should be remeasured.

Although the present invention is illustrated in connection with specific embodiments for instructional purposes, the present invention is not limited thereto. Various adaptations and modifications may be made without departing from the scope of the invention. For example, while the use of light having a normal angle of incidence is described, non-normal angles of incidence may also be used. Therefore, the spirit and scope of the appended claims should not be limited to the foregoing description.

What is claimed is:

1. A method comprising:
    modeling a sample, the sample comprising at least one film and an underlying structure, the underlying structure being a non one dimensional periodic pattern, said modeling a sample comprising:
        generating a first portion of the model for the at least one film based on the physical characteristics of the at least one film; and
        generating a second portion of the model for the underlying structure using a one dimensional periodic pattern based on the affect of the underlying structure on incident light; and
        storing the model of the sample in a computer-readable storage medium.

2. The method of claim 1, wherein the second portion of the model comprises a series of lines and spaces, the lines having a line width and the line and spaces having a pitch.

3. The method of claim 1, wherein the underlying structure of the sample is a two-dimensional-periodic pattern.

4. The method of claim 1, further comprising determining a characteristic of the at least one film at a first location on the sample, wherein determining the characteristic comprises:
  acquiring data from the sample at the first location, the acquired data being indicative of the characteristic of the at least one film and the surface profile of the underlying structure;
  calculating data for the model of the sample, the calculated data being indicative of a characteristic of the first portion of the model and the surface profile of the second portion of the model; and
  comparing the acquired data from the sample and the calculated data for the model of the sample.

5. The method of claim 4, wherein acquiring data for the sample comprises:
  producing light that is incident on the sample;
  detecting light after interacting with the sample; and
  extracting the acquired data from the detected light.

6. The method of claim 5, wherein the acquired data and the calculated data is spectral data.

7. The method of claim 4, wherein the characteristic of the at least one film and the characteristic of the first portion of the model is film thickness.

8. The method of claim 4, further comprising iteratively adjusting at least one parameter of the model of the sample, recalculating data for the model of the sample, and comparing the acquired data from the sample with the recalculated data for the model of the sample until an acceptable fit between the acquired data and the calculated data occurs.

9. The method of claim 4, wherein calculating data for the model of the sample comprises performing rigorous coupled-wave analysis.

10. The method of claim 4, wherein the acquired data consists of data having at least one of TE and TM polarization and wherein calculating data for the model of the sample is performed using only one of the TE and TM orientations.

11. The method of claim 4, further comprising:
  determining a characteristic of the at least one film at a first plurality of locations on the sample, the first plurality of locations having an underlying structure;
  determining a characteristic of the at least one film at a second plurality of locations on the sample, the second plurality of locations do not have an underlying structure, wherein each location in the first plurality of locations is associated with a location in the second plurality of locations;
producing a plurality of ratios, each ratio being between the characteristic of the at least one film at a location in the first plurality of locations and the characteristic of the at least one film at an associated location in the second plurality of locations; and
  determining if the ratios have a linear relationship.

12. The method of claim 11, further comprising:
  determining that the ratio for at least one location of the first plurality of locations on the sample does not have a linear relationship with the remainder of the locations;
  adjusting a parameter of the second portion of the model for the at least one location of the first plurality of locations on the sample;
  re-determining the characteristic of the at least one film for the at least one location of the first plurality of locations on the sample;
  re-producing the ratio for the at least one location of the first plurality of locations on the sample; and
  determining if the ratios have a linear relationship.

13. A method of determining a characteristic of at least one film on a sample, the sample having a structure underlying the at least one film, the method comprising:
  acquiring data from the sample, the acquired data being indicative of the characteristic of the at least one film and the surface profile of the underlying structure;
  modeling the sample, wherein modeling the sample comprises:
    generating a first portion of the model for the at least one film based on the physical characteristics of the at least one film;
    generating a second portion of the model for the underlying structure, wherein the second portion of the model is not based on the physical characteristics of the underlying structure and is based on the affect of the underlying structure on incident light;
  calculating data for the model of the sample, the calculated data being indicative of a characteristic of the first portion of the model and the surface profile of the second portion of the model; and
  comparing the acquired data from the sample and the calculated data for the model of the sample; and
  storing the results of the comparison of the acquired data from the sample and the calculated data for the model of the sample.

14. The method of claim 13, wherein acquiring data for the sample comprises:
  producing light that is incident on the sample;
  detecting light after interacting with the sample; and
  extracting the acquired data from the detected light.

15. The method of claim 13, wherein the characteristic of the at least one film and the characteristic of the first portion of the model is film thickness.

16. The method of claim 13, wherein the underlying structure of the sample is a non-one-dimensional-periodic pattern and the second portion of the model is a one-dimensional periodic pattern.

17. The method of claim 16, wherein the underlying structure of the sample is a two-dimensional-periodic pattern.

18. The method of claim 13, further comprising iteratively adjusting at least one parameter of the model of the sample, recalculating data for the model of the sample, and comparing the acquired data from the sample with the recalculated data for the model of the sample until an acceptable fit between the acquired data and the calculated data occurs.

19. The method of claim 13, wherein the acquired data consists of data having at least one of TE and TM polarization and wherein calculating data for the model of the sample is performed using only one of the TE and TM orientations.

20. The method of claim 13, further comprising:
  determining a characteristic of the at least one film at a first plurality of locations on the sample, the first plurality of locations having an underlying structure;
  determining a characteristic of the at least one film at a second plurality of locations on the sample, the second plurality of locations do not have an underlying structure, wherein each location in the first plurality of locations is associated with a location in the second plurality of locations;
  producing a plurality of ratios, each ratio being between the characteristic of the at least one film at a location in the first plurality of locations and the characteristic of the at least one film at an associated location in the second plurality of locations; and determining if the ratios have a linear relationship.

21. The method of claim 20, further comprising:
determining that the ratio for at least one location of the first plurality of locations on the sample does not have a linear relationship with the remainder of the locations;
adjusting a parameter of the second portion of the model for the at least one location of the first plurality of locations on the sample;
re-determining the characteristic of the at least one film for the at least at one location of the first plurality of locations on the sample;
re-producing the ratio for the at least one location of the first plurality of locations on the sample; and
determining if the ratios have a linear relationship.

22. A method of determining a characteristic of at least one film on a sample, the sample having a structure underlying the at least one film, the method comprising:
acquiring data from the sample, the acquired data being indicative of the characteristic of the at least one film and the surface profile of the underlying structure;
acquiring calculated data for a model of the sample, the model of the sample comprising a first portion that describes the at least one film based on the physical characteristics of the at least one film, and a second portion that describes the underlying structure based on the affect of the underlying structure on incident light and not based on the physical characteristics of the underlying structure, the calculated data being indicative of a characteristic of the first portion of the model and the surface profile of the second portion of the model;
comparing the acquired data from the sample and the calculated data for the model of the sample; and
reporting the characteristic of the at least one film on the sample based on the model of the sample.

23. An apparatus for determining a characteristic of at least one film on a sample, the sample having a structure underlying the at least one film, the apparatus comprising:
a metrology device that acquires data from the sample, the acquired data being indicative of the characteristic of the at least one film and the surface profile of the underlying structure; and
a computer connected to said metrology device and a computer-readable storage medium storing a computer program executable by the computer, the computer program including instructions for:
acquiring calculated data for a model of the sample, the model of the sample comprising a first portion that describes the at least one film based on the physical characteristics of the at least one film, and a second portion that describes the underlying structure based on the affect of the underlying structure on incident light and not based on the physical characteristics of the underlying structure, the calculated data being indicative of a characteristic of the first portion of the model and the surface profile of the second portion of the model;
comparing the acquired data from the sample and the calculated data for the model of the sample; and
reporting the characteristic of the at least one film on the sample based on the model of the sample.

24. The apparatus of claim 23, wherein the characteristic of the at least one film and the characteristic of the first portion of the model is film thickness.

25. The apparatus of claim 23, wherein the underlying structure of the sample is a non-one-dimensional-periodic pattern and the second portion of the model is a one-dimensional periodic pattern.

26. The apparatus of claim 25, wherein the underlying structure of the sample is a two-dimensional-periodic pattern.

27. The apparatus of claim 23, wherein the acquired data consists of data having at least one of TE and TM polarization and wherein acquired calculated data for the model of the sample includes only one of the TE and TM orientations.

* * * * *